United States Patent [19]

Kamada et al.

[11] Patent Number: 6,070,963
[45] Date of Patent: Jun. 6, 2000

[54] INTERLACE RECORDING APPARATUS AND METHOD

[75] Inventors: Masashi Kamada, Irvine, Calif.; Takayuki Ninomiya, Ichikawa; Kazuhiko Morimura, Yokohama, both of Japan

[73] Assignee: Canon Kabushiki Kaisha, Tokyo, Japan

[21] Appl. No.: 08/653,399

[22] Filed: May 24, 1996

[30] Foreign Application Priority Data

May 30, 1995 [JP] Japan ................................. 7-131443

[51] Int. Cl.[7] ............................................... B41J 2/145
[52] U.S. Cl. ................................................ 347/41; 347/12
[58] Field of Search .................................. 347/41, 12, 40, 347/9; 395/108

[56] References Cited

U.S. PATENT DOCUMENTS

| 4,313,124 | 1/1982 | Hara ............................................. 347/51 |
| 4,345,262 | 8/1982 | Shirato et al. .............................. 347/10 |
| 4,401,991 | 8/1983 | Martin . |
| 4,459,600 | 7/1984 | Sato et al. .................................... 347/47 |
| 4,463,359 | 7/1984 | Ayata et al. ................................. 347/56 |
| 4,558,333 | 12/1985 | Sugitani et al. ............................ 347/65 |
| 4,608,577 | 8/1986 | Hori ............................................ 347/66 |
| 4,723,129 | 2/1988 | Endo et al. .................................. 347/56 |
| 4,740,796 | 4/1988 | Endo et al. .................................. 347/56 |
| 4,748,453 | 5/1988 | Lin et al. ..................................... 347/41 |
| 4,965,593 | 10/1990 | Hickman .................................... 347/12 |
| 5,070,345 | 12/1991 | Lahut et al. ................................. 347/41 |
| 5,124,720 | 6/1992 | Schantz ....................................... 347/40 |
| 5,239,312 | 8/1993 | Merna et al. . |
| 5,354,135 | 10/1994 | Sakagamo et al. ........................ 395/108 |
| 5,373,368 | 12/1994 | Taniguro .................................... 347/3 X |
| 5,427,461 | 6/1995 | Hirai et al. ................................ 400/279 |
| 5,686,944 | 11/1997 | Takagi et al. ............................... 347/41 |
| 5,692,108 | 11/1997 | Donahue .................................... 395/108 |

FOREIGN PATENT DOCUMENTS

| 0 422 925 | 4/1991 | European Pat. Off. . |
| 0 582 432 | 2/1994 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 61-23463 | 1/1986 | Japan . |
| 62-26972 | 2/1987 | Japan . |
| 5-031922 | 2/1993 | Japan . |

Primary Examiner—N. Le
Assistant Examiner—Shih-Wen Hsieh
Attorney, Agent, or Firm—Fitzpatrick, Cella, Harper & Scinto

[57] ABSTRACT

A recording apparatus records at a higher density than the density of arranged recording elements of a recording head by interlace recording. A scanning section makes the recording head sub-scan in order to enable the recording head to interlace record between lines of dots recorded in main scannings. A read-out section reads out the same recording data from a memory two or more times. With every reading of the recording data, a selector complementarily selects recording data from the recording data read out from the memory and supplies the selected recording data to the recording head.

46 Claims, 10 Drawing Sheets

START ADDRESS ↓

| 15 | 15 | 15 | 15 | 15 | 15 |
|----|----|----|----|----|----|
| 14 | 14 | 14 | 14 | 14 | 14 |
| 13 | 13 | 13 | 13 | 13 | 13 |
| 12 | 12 | 12 | 12 | 12 | 12 |
| 11 | 11 | 11 | 11 | 11 | 11 |
| 10 | 10 | 10 | 10 | 10 | 10 |
| 9  | 9  | 9  | 9  | 9  | 9  |
| 8  | 8  | 8  | 8  | 8  | 8  |
| 7  | 7  | 7  | 7  | 7  | 7  |
| 6  | 6  | 6  | 6  | 6  | 6  |
| 5  | 5  | 5  | 5  | 5  | 5  |
| 4  | 4  | 4  | 4  | 4  | 4  |
| 3  | 3  | 3  | 3  | 3  | 3  |
| 2  | 2  | 2  | 2  | 2  | 2  |
| 1  | 1  | 1  | 1  | 1  | 1  |
| 0  | 0  | 0  | 0  | 0  | 0  |

END ADDRESS ↓

START ADDRESS ↓

| 15 | 15 | 15 | 15 | 15 | 15 |
|----|----|----|----|----|----|
| 14 | 14 | 14 | 14 | 14 | 14 |
| 13 | 13 | 13 | 13 | 13 | 13 |
| 12 | 12 | 12 | 12 | 12 | 12 |
| 11 | 11 | 11 | 11 | 11 | 11 |
| 10 | 10 | 10 | 10 | 10 | 10 |
| 9  | 9  | 9  | 9  | 9  | 9  |
| 8  | 8  | 8  | 8  | 8  | 8  |
| 7  | 7  | 7  | 7  | 7  | 7  |
| 6  | 6  | 6  | 6  | 6  | 6  |
| 5  | 5  | 5  | 5  | 5  | 5  |
| 4  | 4  | 4  | 4  | 4  | 4  |
| 3  | 3  | 3  | 3  | 3  | 3  |
| 2  | 2  | 2  | 2  | 2  | 2  |
| 1  | 1  | 1  | 1  | 1  | 1  |
| 0  | 0  | 0  | 0  | 0  | 0  |

END ADDRESS ↓

15
14
13
12
11
10
9
8
7
6
5
4
3
2
1
0

INTERLACE RECORDING APPARATUS AND METHOD

BACKGROUND OF THE INVENTION

1. Field of the Invention

This invention relates to an interlace recording apparatus and method. More specifically, this invention relates to an interlace recording apparatus and method which perform recording using an ink jet recording head.

2. Description of the Related Art

Recently, since demands for quality improvement of a recorded image are increasing, attempts have been made to raise recording resolution in a printer. For example, in the recording apparatus which scans an ink jet recording head in the main scanning direction and performs image recording by discharging ink on a recording medium during the scanning, attempts have been made to improve recording resolution with regard to the main scanning direction as follows.

When ink is discharged from a nozzle of the recording head corresponding to a position of a carriage, which carries the recording head and moves back and forth in the direction of the main scanning, if resolution of carriage position detection is doubled, an additional dot can be formed between dots formed by conventional ink discharge on the recording medium. This modification can be performed relatively easily. For example, when recording resolution with regard to the main scanning direction is 360 dpi (dot per inch), if a head controller is modified to be able to generate a drive timing signal of the recording elements provided with the recording head in between adjacent dots, it is possible to turn recording resolution with regard to the main scanning direction into 720 dpi.

Attempts have been made to improve recording resolution with regard to the sub-scanning direction, which is a feed direction of a recording medium, as follows.

One attempt is, for example, to make a recording head having a recording resolution of 720 dpi by making nozzles of the recording head arranged in the direction of sub-scanning themselves minute and at an increased nozzle density. However, a technical barrier is high with respect to construction accuracy of the recording head nozzles in this case, so it is difficult to realize.

Another attempt is to not alter the nozzle resolution or density (for example, 360 dpi), but rather to improve the resolution in the sub-scanning direction, for example, by refining resolution of a line feed control of the recording medium. In order to change a recording resolution of 360 dpi into a recording resolution of 720 dpi, first recording is performed at a standard (normal) recording position at the recording resolution of 360 dpi with one line of dots being formed for each nozzle of the recording head, and next recording is performed at the middle position between adjacent lines of dots in one main scan. In other words, interlace recording is performed.

Figure 8:
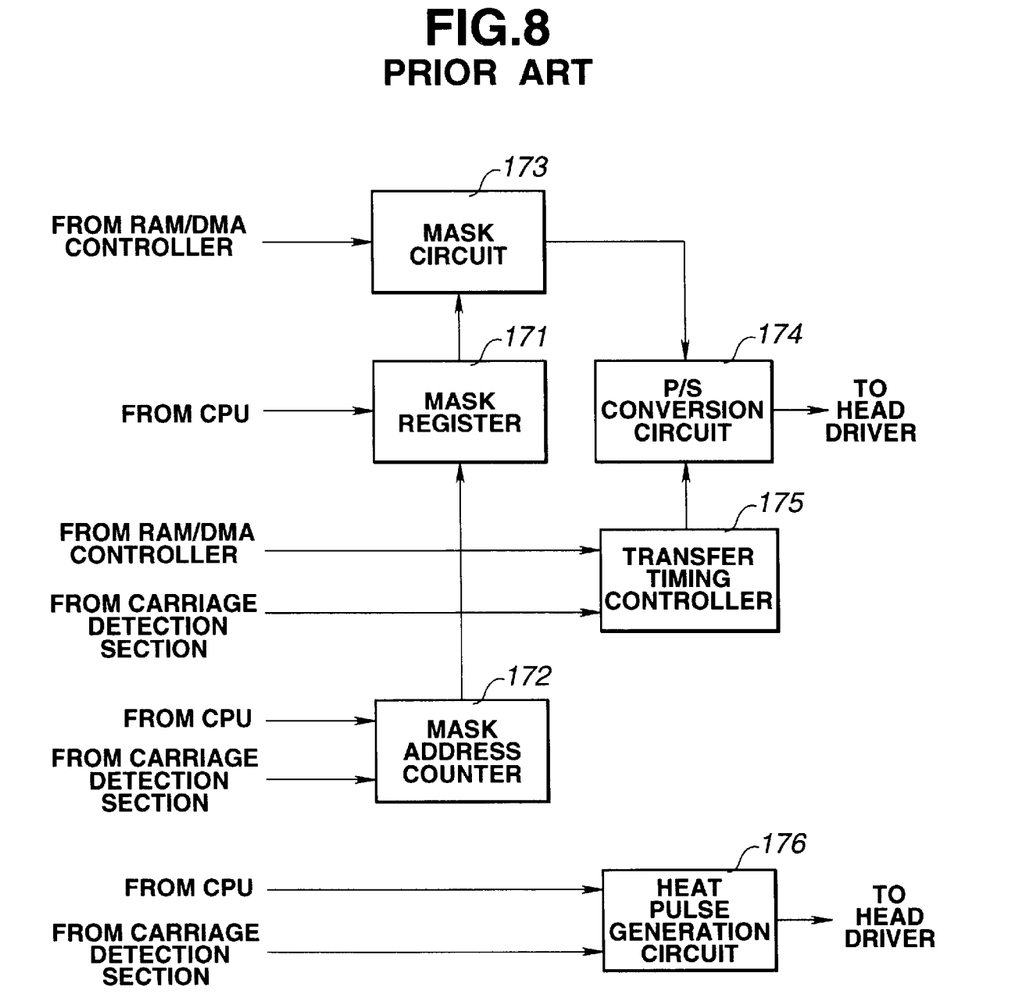
FIG. 8 is a block diagram showing structure of a conventional head controller.

FIG. 8 is a block diagram showing structure of a conventional head controller which controls interlace recording. The controller includes a control circuit of a printer using an ink jet recording head and controls the recording head. By controlling interlace recording using the controller, recording can be effected at a recording resolution of 720 dpi using the recording head of which the nozzle recording resolution is 360 dpi. In the following, in order to make the explanation simple, the number (N) of nozzles of the recording head is 16.

In FIG. 8, reference numeral 171 is a mask register which stores a matrix of a mask used in multi-pass recording control to reduce recording unevenness (banding). With regard to the multi-pass recording control, such is described in detail in Japanese Laid-Open Patent Application No. 5-31922. The description of multi-pass recording in that Japanese document is incorporated herein by reference. Reference numeral 172 is a mask address counter indicating an address of the mask register 171, and reference numeral 173 is a mask circuit operating the logical product of 16 bits of recording data and 16 bits of mask data. Reference numeral 174 is a parallel/serial conversion circuit latching output from the mask circuit 173 and transferring 16 bits of recording data into a head driver serially, reference numeral 175 is a transfer timing controller controlling transfer timing of the parallel/serial conversion circuit 174, and reference numeral 176 is a heat pulse generating circuit.

A control signal and recording data are input to the head controller of such structure from a CPU (not shown), which is additional structure of the control circuit, as well as a carriage position detecting section and a RAM/DMA controller for performing transfer control of the recording data. First of all, when the recording timing pulse of the main scanning direction input from the carriage position detecting section is detected, the mask address counter 172 counts up. In a case where recording is performed during the return of the recording head, it counts down. The mask data is output from an address of the mask register 171 which is determined by a count value of the counter 172, and recording data is transferred to the mask circuit 173 from the RAM/DMA controller. The mask circuit 173 operates the logical product of the mask data and recording data, and the logical operation result is latched by the parallel/serial conversion circuit 174.

After that, recording data is serially transferred from the parallel/serial conversion circuit 174 to the head driver according to a transfer clock pulse supplied from the transfer timing controller 175. By the heat pulse generating circuit 176 sending a heat signal to the head driver, electric current flows to the recording elements of the recording head and then the heaters of the recording elements are heated at the time of current input following the recording timing pulse of the main scanning direction.

Figure 9:
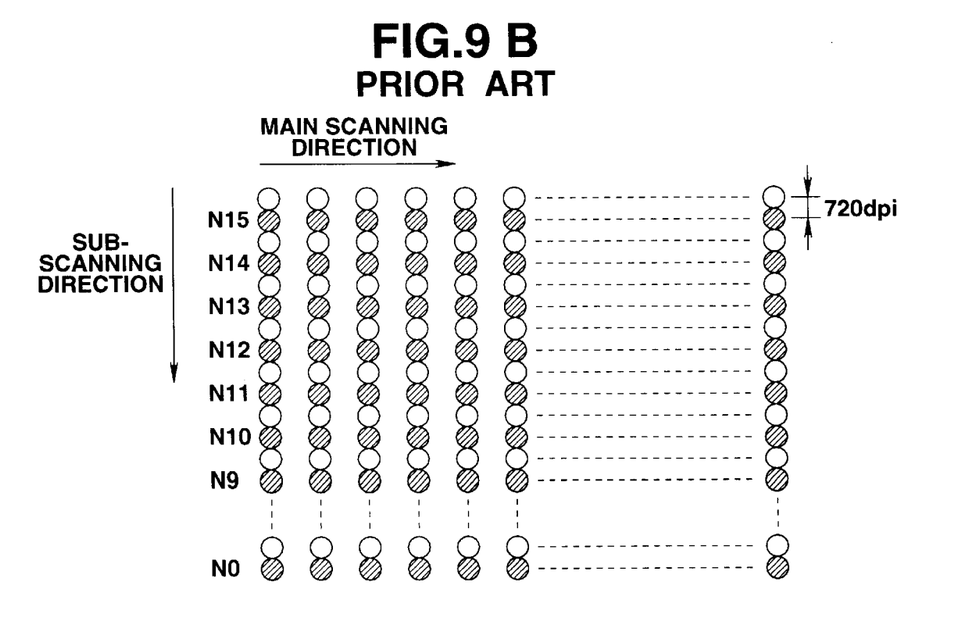
FIGS. 9A and 9B are illustrations showing a condition of conventional interlace recording.
Figure 9A:
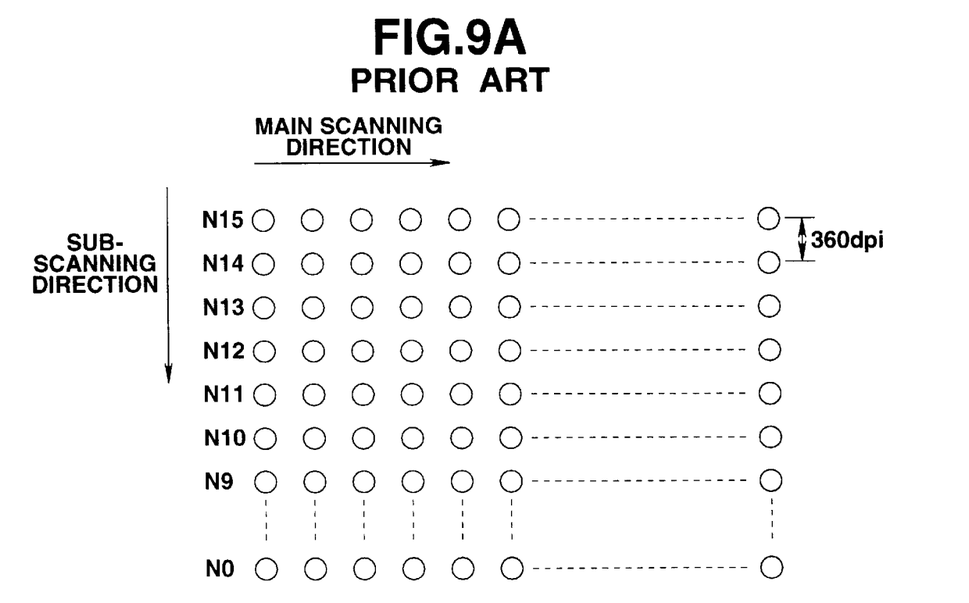

FIGS. 9A and 9B are illustrations showing a condition of interlace recording at a recording resolution of 720 dpi using a recording head having a nozzle recording resolution of 360 dpi and having 16 nozzles in the sub-scanning direction. In FIGS. 9A and 9B, N15, N14, N13, . . . , N0 show 16 nozzles, respectively. In the interlace recording, while moving the recording head in the main scanning direction at a standard recording position, recording is first performed at recording resolution of 360 dpi. In other words, a start address of a RAM which stores recording data used to record at a standard recording position is set in the DMA/RAM controller, the carriage carrying the recording head is moved by driving a carriage motor and one main scan line (16 nozzle width) of recording is performed with one line of dots corresponding to each of the 16 nozzles. By the recording, the dots shown as white circles are recorded as shown in FIG. 9A.

Secondly, the recording medium is fed by $1/720$ inch in the sub-scanning direction by driving a line feed motor. A start address of the RAM which stores recording data used to record between adjacent lines of dots recorded previously is set in the DMA/RAM controller, the carriage carrying the recording head is moved by driving the carriage motor and one line (16 nozzle width) of recording is performed. By the recording, the dots shown as cross-hatched circles are recorded as shown in FIG. 9B.

Figure 10A:
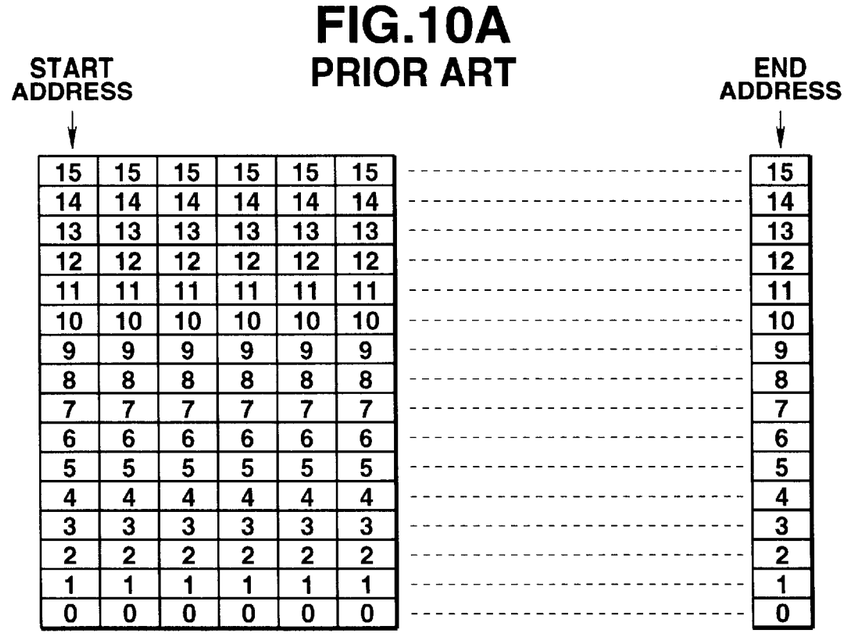
FIGS. 10A and 10B are illustrations showing one example of the recording data developed in a RAM according to a conventional interlace recording.
Figure 10B:
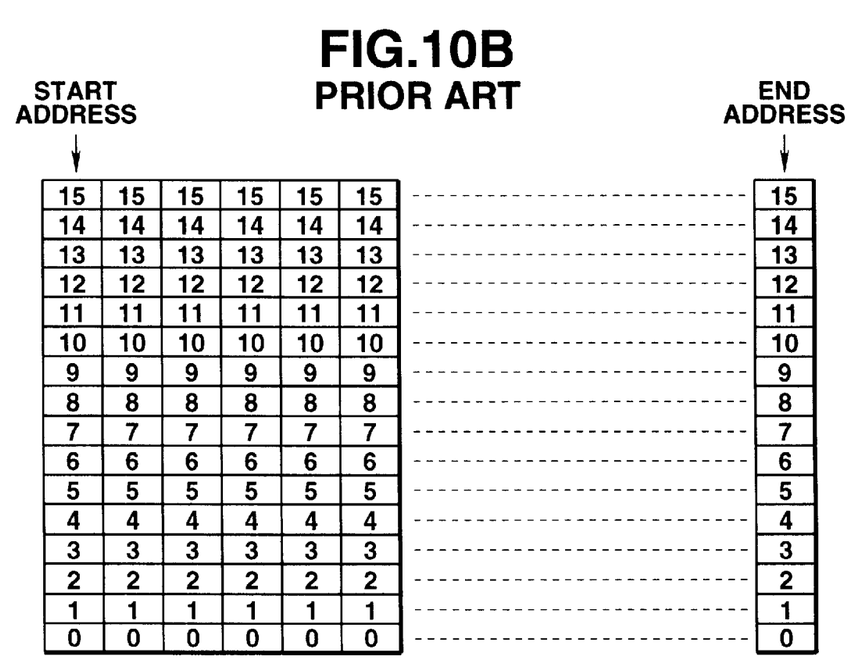

By recording two times as mentioned above, image recording having one line of a 32 dot width (16 nozzle width), at a resolution of 720 dpi is completed in the sub scanning direction. FIGS. 10A and 10B are illustrations showing one example of the recording data arranged in the RAM within a control circuit in the case of interlace recording mentioned above. FIG. 10A shows the image data prepared for the recording shown in FIG. 9A, and FIG. 10B shows the image data prepared for the recording shown in FIG. 9B. In addition, the numerical values shown in FIGS. 10A and 10B correspond to a nozzle number of the 16 nozzles. For example, "9" corresponds to the data to be recorded by nozzle number N9. In this way, the conventional interlace recording requires one area (recording buffer) storing the recording data to be recorded at the standard recording positions and another area storing the recording data to be recorded in between the standard positions (hereinafter, called interlace recording position) within the RAM.

In the prior art the following problems arise. In conventional interlace recording, the CPU of the control circuit carries out a control program to develop the recording data which are the recording data to be recorded at the standard recording positions (for example, at the 360 dpi positions) and the recording data to be recorded at the interlace recording positions (for example, at the 720 dpi positions) and to store them separately in the RAM. The load on the CPU increases because of this process, so recording performance falls as a result.

Moreover, when recording is performed at a recording resolution of 720 dpi with regard to both the main scanning direction and the sub-scanning direction, four times the capacity of the recording buffer is required in the prior art mentioned above. For this reason, in the prior art the size of the RAM has to be increased and drastic modification of the circuit board is required resulting in a rise in the production cost.

SUMMARY OF THE INVENTION

One object of the present invention is to provide an interlace recording apparatus and method which can record at a high resolution without an increased load on the CPU.

It is another object of the invention to provide an interlace recording apparatus and method which can record at a high resolution with a simple structure.

According to one aspect of the present invention there is provided a recording apparatus for recording onto a recording medium at a higher density than a density at which recording elements of a recording head are arranged by performing interlace recording, said recording apparatus comprising:

a main scanning section for main scanning the recording head;

a sub-scanning section for relatively sub scanning the recording head and the recording medium;

a scanning controller for controlling sub-scan between the recording head and the recording medium to enable the recording head to interlace record between lines of dots recorded in main scannings;

a memory for storing recording data;

a read-out section for reading out same recording data from said memory at least two times; and a selector for complementarily selecting recording data from the same recording data read from the memory to supply the selected recording data to the recording head with every reading of the recording data by the read-out section.

According to another aspect of the present invention there is provided a controller for controlling recording onto a recording medium at a higher density than a density at which recording elements of a recording head are arranged by controlling interlace recording, said controller comprising:

a scanning controller for controlling sub-scan between the recording head and the recording medium to enable the recording head to interlace record between lines of dots recorded in main scannings;

a read-out section for reading out same recording data from a memory at least two times; and a selector for complementarily selecting recording data from the same recording data read from the memory to supply the selected recording data to the recording head with every reading of the recording data by the read-out section.

According to yet another aspect of the invention there is provided a recording method for recording onto a recording medium at a higher density than a density at which recording elements of a recording head are arranged by performing interlace recording, said recording method comprising the steps of:

reading recording data from a memory;

selecting recording data from the recording data read from the memory to supply the selected recording data to the recording head;

recording onto the recording medium based on the selected recording data during main scanning of the recording head;

relatively sub-scanning the recording head to the recording medium to enable the recording head to interlace record between lines of dots recorded in the main scanning of the recording step;

reading same recording data from the memory;

complementarily selecting recording data from the same recording data read from the memory to supply the complementarily selected recording data to the recording head; and recording onto the recording medium based on the complementarily selected recording data during main scanning of the recording head.

DETAILED DESCRIPTION OF THE PREFERRED EMBODIMENTS

The preferred embodiments of the present invention will now be described with reference to the drawings.

<First Embodiment>

Figure 1:
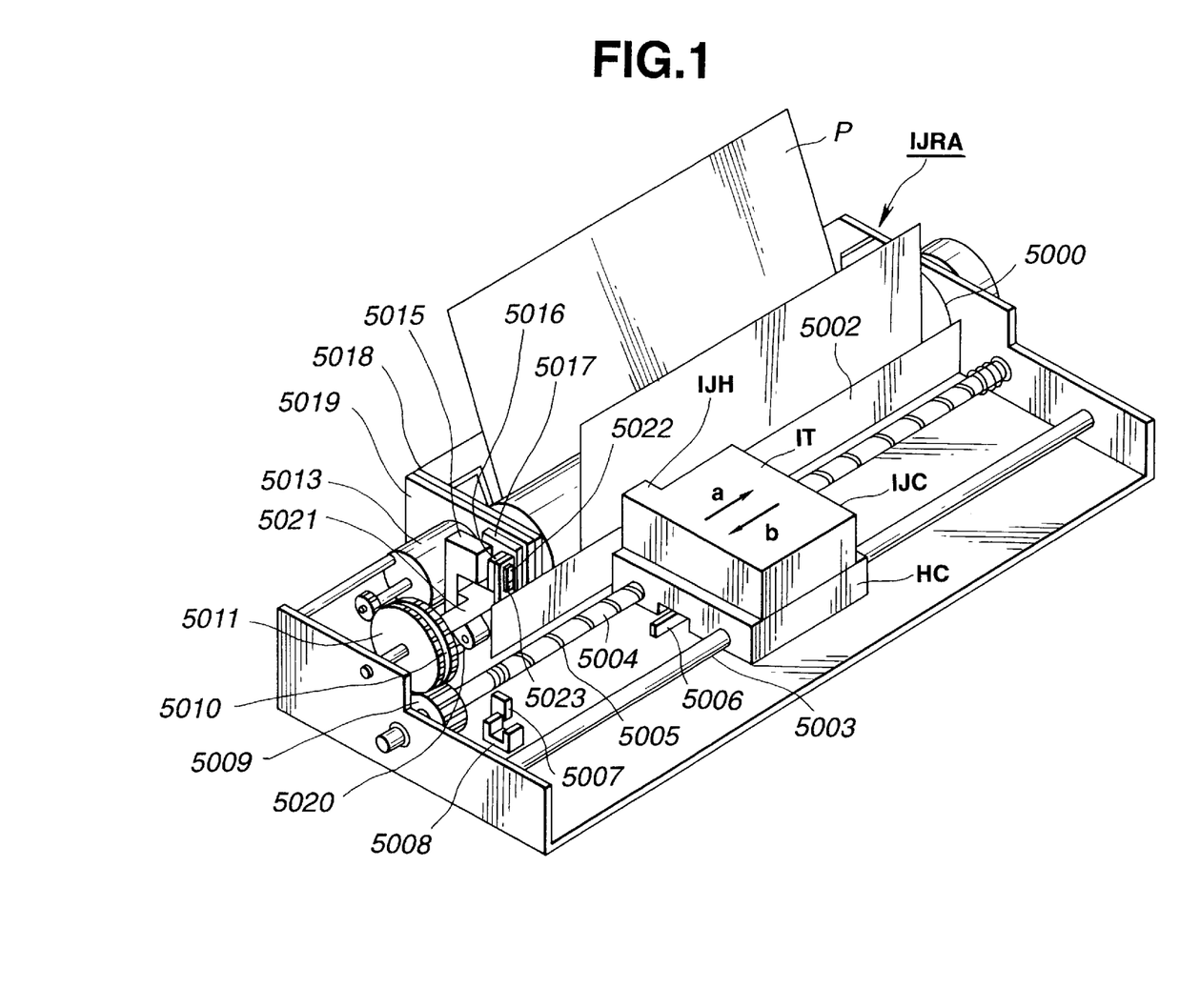
FIG. 1 is a perspective view showing structure of an ink jet recording apparatus (IJRA) or printer to which the present invention can be applied.

FIG. 1 is a perspective view showing an ink jet recording apparatus (IJRA) to which the present invention can be applied. Referring to FIG. 1, a carriage HC engages a spiral groove 5005 of a lead screw 5004, which is, through rotational-force transmission gears 5009 to 5011, rotated in synchronization with forward/reverse rotations of a drive motor 5013. The carriage HC has a pin (not shown) by means of which the carriage HC is reciprocated in the directions indicated by arrows a and b along a supporting guide rail 5003. The carriage HC has an ink jet cartridge IJC including a recording head IJH and an ink tank IT mounted thereon. The ink tank IT is filled with ink. Reference numeral 5002 represents a paper retaining plate which presses paper against a platen 5000 in a direction transverse to the directions a and b, in which the carriage HC is moved. Reference numerals 5007 and 5008 represent a photocouple to serve as a home position detecting means which checks for the presence of a lever 5006 on the carriage HC in the region between them in order, for example, to switch the rotational direction of the motor 5013. Reference numeral 5016 represents a member for controlling a capping member 5022 which caps the discharge surface of the recording head. Reference numeral 5015 represents a suction device for suctioning the inside portion of the capping member 5022, the suction device 5015 being arranged to recover the recording head by suctioning viscous or dried ink, dust and debris through an opening 5023 in the capping member 5022. Reference numeral 5017 represents a cleaning blade which is moved forward/rearward by a member 5019. Reference numeral 5018 represents a support so integrally formed with the body of the ink jet recording apparatus to support the cleaning blade 5017 and the member 5019. The blade is not limited to that shown in this figure, but any suitable known cleaning blade may be applied to this embodiment. Reference numeral 5021 represents a lever for starting the suction operation for suction recovery, the lever 5021 being moved by a cam 5020 contacting the carriage HC as the carriage is moved into and out of its home position. The drive force of the drive motor 5013 is used to control the movement of the carriage HC via a known transmission device, such as a clutch mechanism.

The foregoing capping, cleaning and suction recovery operations can be performed at corresponding positions by the operation of a lead screw 5004 when the carriage HC has been brought to the home position region. The foregoing operations are performed at a predetermined timing.

The ink jet printer IJRA of this embodiment can record at resolution X (for example, 360 dpi) in a standard mode so it has a recording head IJH that has N (N: multiple of 2, for example, 16) nozzles spaced for a nozzle resolution Y (for example, 360 dpi). Moreover, each of the 16 nozzles of the recording head IJH is referred to by a nozzle number of N0, N1, N2, . . . , N15 in the drawings.

The control structure to perform recording control of the above-mentioned apparatus will now be explained.

Figure 2:
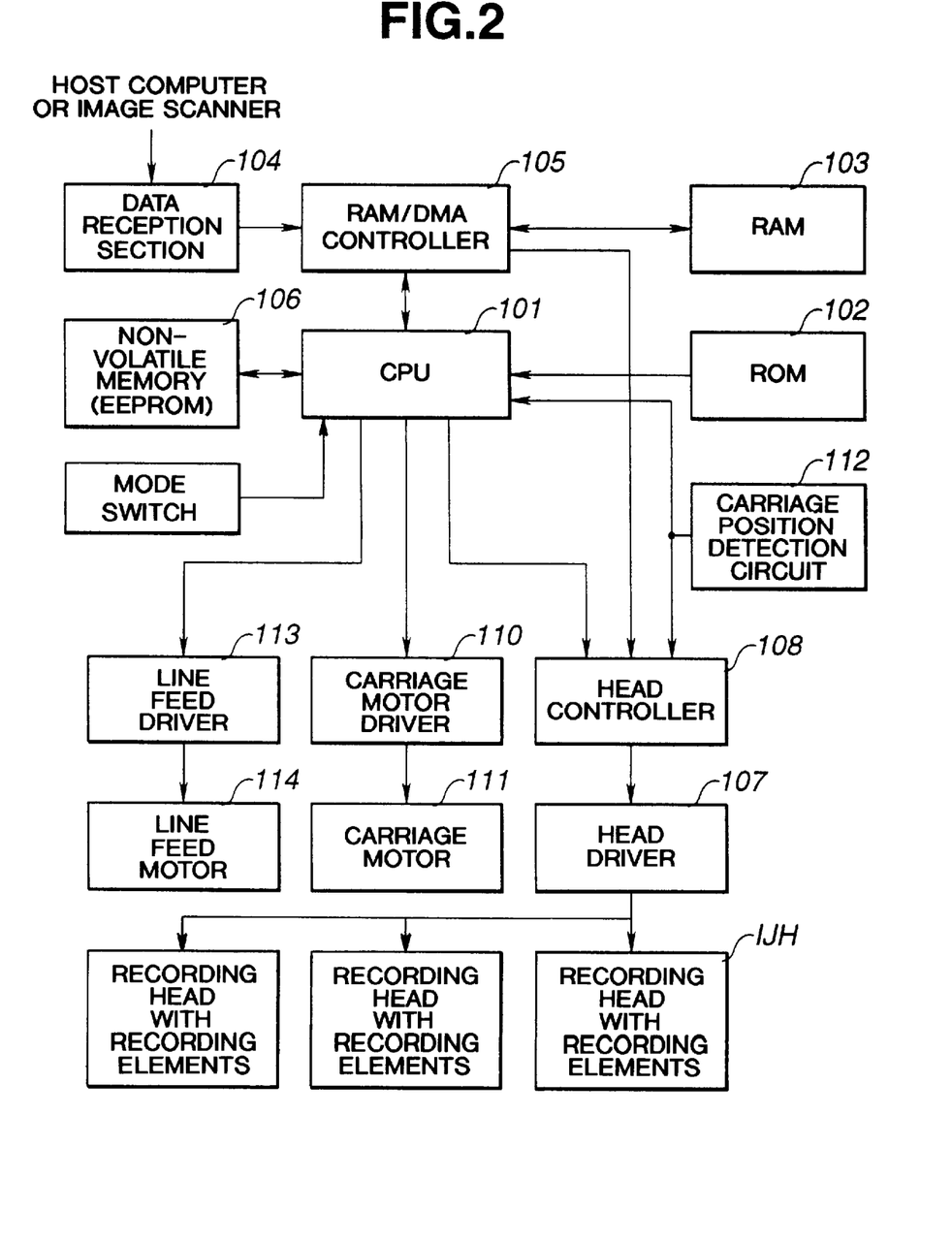
FIG. 2 is a block diagram showing structure of a control circuit of the ink jet printer IJRA of FIG. 1.

FIG. 2 is a block diagram showing a structure for controlling the ink jet recording apparatus shown in FIG. 1.

Referring to FIG. 2, reference numeral 101 is a CPU performing operation control of this apparatus and data processing, reference numeral 102 is a ROM storing every kind of data for a control program of CPU 101 and a font processing, and reference numeral 103 is a RAM temporarily storing every kind of data including received image data. Reference numeral 104 is a data reception section which controls communication between itself and an outside apparatus (not shown) such as a host computer (hereinafter, called a host) and which receives the image data sent from the outside apparatus. Reference numeral 105 is a RAM/DMA controller which transfers the image data received at the data reception section 104 to the RAM 103 by direct memory access (DMA), transfers the image data stored in the RAM 103 to a head controller 108 by DMA and controls access from the CPU 101 to the RAM 103. Reference numeral 106 is a nonvolatile memory such as an EEPROM storing a parameter peculiar to a printer, reference numeral 107 is a head driver driving the recording head IJH, and reference numeral 108 is the head controller transferring the image data to the head driver 107 and generating a heat pulse signal based on control by the CPU 101.

A carriage motor driver 110, a carriage motor 111 and carriage position detecting circuit 112 are control systems controlling movement (the direction is called a main scanning direction) of the recording head IJH by a control signal supplied from the CPU 101 and a recording timing pulse supplied from an encoder and so on. A line feed motor driver 113 and a line feed motor 114 are control systems controlling feed (the direction is called sub-scanning direction) of the recording medium such as recording paper P by a control signal supplied from the CPU 101.

A process of recording control will be explained referring to FIG. 2. First of all, the data input by the data reception section 104 from the host is stored temporarily in the RAM 103 through the RAM/DMA controller 105. The CPU 101 carries out the control program stored in the ROM 102 and analyzes a reception command, image data and a character code. Afterward, input image data is converted by the CPU 101 into recording data and is stored in the RAM 103 in order.

When one line of recording data is finished developing or a recording command (one of reception commands) is input from the host, the carriage motor 111 is driven by the carriage motor driver 110. With driving by the carriage motor 111, a recording timing pulse is output from the carriage position detecting circuit 112.

In synchronization with the recording timing pulse, the recording data stored in the RAM 103 is transferred to the head driver 107 through the DMA/RAM controller 105 and the head controller 108. As a result, a heat pulse signal is sent to the head driver 107 from the head controller 108 and ink is discharged from the recording head IJH based on the transferred recording data.

After finishing one line of recording, the line feed motor 114 is driven by the line feed motor drive section 113 to perform line feed. Thus, the recording control process for one line of standard recording ends. By repeating such process over one page of the recording paper P, a one page recording operation is completed.

Figure 3:
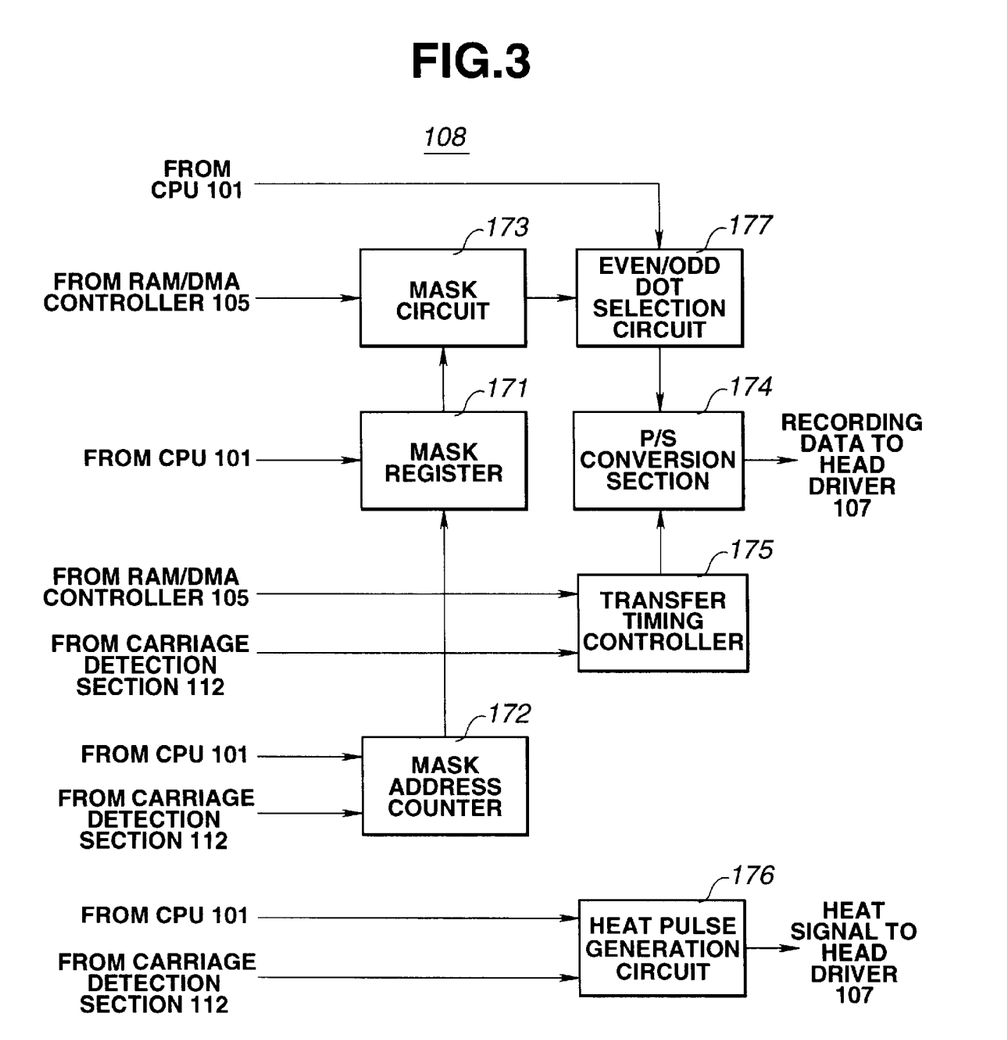
FIG. 3 is a block diagram showing detailed structure of a head controller shown in FIG. 2.

FIG. 3 is a block diagram showing detailed structure of the head controller 108. Interlace recording is performed by control of the head controller 108, so the recording resolution in the sub-scanning direction doubles (720 dpi in this embodiment). In FIG. 3, the same reference numerals designate the same structural elements already discussed with respect to FIG. 8 and will be given no further explanation.

Further, since the carriage movement control concerning the main scanning direction and control such as generating of the heat signal to be supplied for an ink discharge are similar to the prior art, they will also not be described further. In FIG. 3 numeral 177 is an even/odd number dot selection circuit. The interlace recording control, a characteristic feature of this embodiment, will be described below.

The mask address counter 172 counts up at timing of detecting the recording timing pulse concerning the main scanning direction which is generated by the carriage position sensing circuit 112 and is input into the head controller 108. The mask data is output to the mask circuit 173 from an address of the mask register 171 which is designated by the count value, and recording data (16 bits) corresponding to 16 nozzles is transferred to the mask circuit 173 from the RAM/DMA controller 105. In the mask circuit 173, a logical product of the recording data and the mask data is operated and the operation result is input in the even/odd number dot selection circuit 177.

In the even/odd number dot selection circuit 177, according to a control signal from the CPU 101 an even number bit or an odd number bit is selected to be output and the selected bit is latched by the parallel/serial conversion section 174. Here, even number bit means the recording data corresponding to even number nozzles (N0, N2, N4, ..., N14) of the recording head and odd number bit means the recording data corresponding to odd number nozzles (N1, N3, N5, ..., N15) of the recording head.

Therefore, since the substantial recording data output from the even/odd number dot selection circuit 177 is reduced to 8 bits, that is half of the original recording data, "NULL" data is supplied in the even/odd number dot selection circuit 177 as the remaining 8 bits of data and is output. In the interlace recording of this embodiment, the upper half 8 nozzles (N8 to N15) of the 16 nozzles of the recording head IJH are practically used at the recording operation and "NULL" data is transferred to the lower half 8 nozzles (N0 to N7). So the lower half 8 nozzles are practically not used in the recording operation.

When data transfer to the parallel/serial conversion section 174 is terminated, recording data is serially transferred to the head driver 107 from the parallel/serial conversion circuit 174 according to the transfer clock supplied from the transfer timing controller 175 like the prior art.

Figure 4:
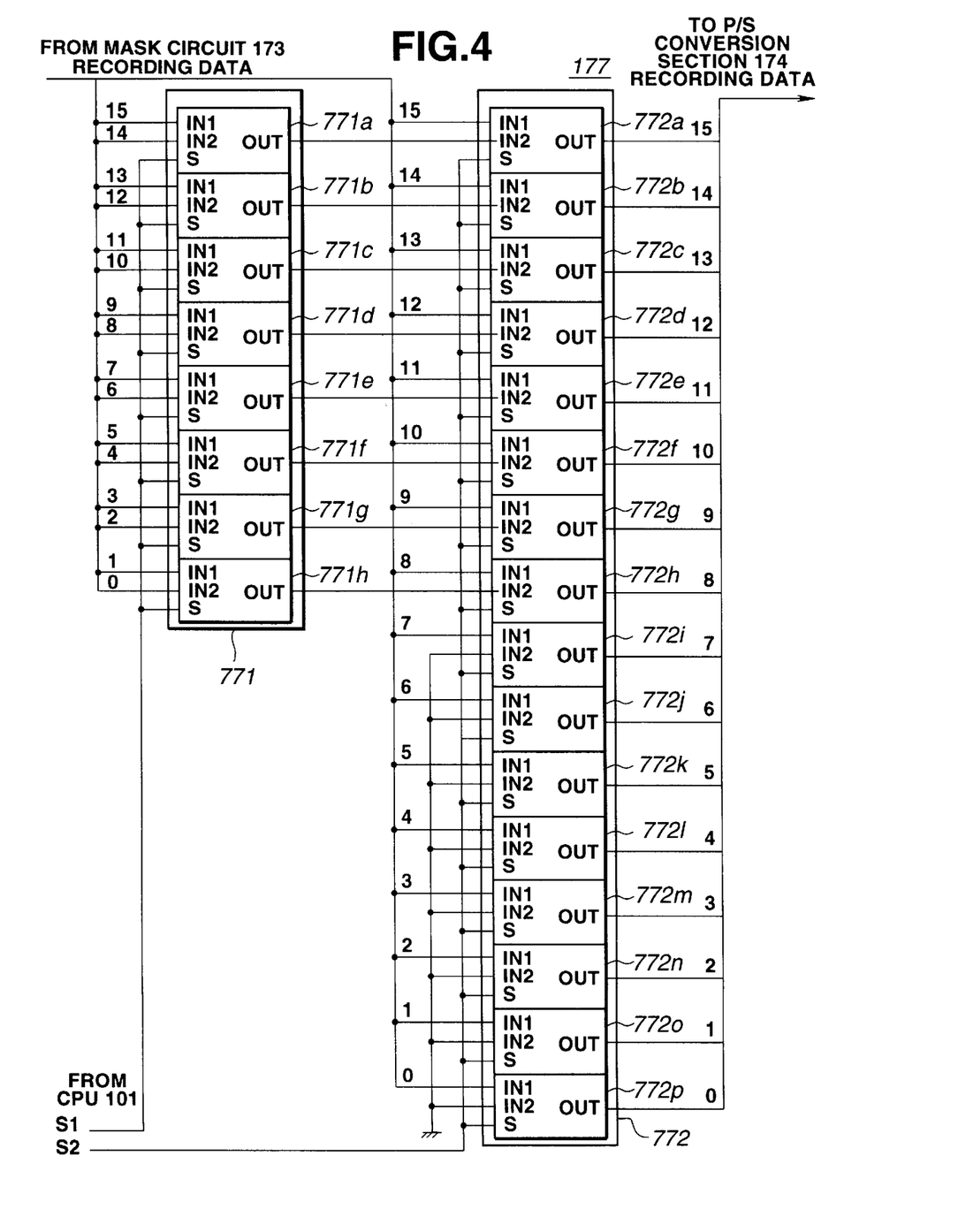
FIG. 4 is a block diagram showing detailed structure of an even/odd number dot selection circuit of a first embodiment of the present invention.

FIG. 4 is the block diagram showing detailed structure of the even/odd number dot selection circuit 177. As shown in FIG. 4, the even/odd number dot selection circuit 177 is comprised of 24 selectors that each have two input and one output terminals. Selective operation of these selectors is controlled by two selection signals S1 and S2 input from the CPU 101.

In other words, the selection signal S1 is input in the first selector group 771 comprised of 8 selectors 771a to 771h out of the 24 total selectors, and on the other hand another selection signal S2 is input in the second selector group 772 comprised of the remaining 16 selectors 772a to 772p. Recording data corresponding to nozzles N15 to N0 of the recording head is input in the input terminals of the 8 selectors which belong to the first selector group 771 as shown in FIG. 4. For example, the recording data corresponding to nozzles N15 and N14 of the recording head is input respectively to two input terminals (IN1, IN2) of selector 771a, and the recording data corresponding to nozzles N13 and N12 of the recording head is input respectively to two input terminals (IN1, IN2) of selector 771b.

In this way, according to the control signal S1, data of odd number dots or data of even number dots is selected from the recording data input to the first selector group 771 and is output respectively from the output terminal (OUT) of those selectors. Output data is input to the input terminals IN2 of selectors 772a to 772h of the second selector group 772 as shown in FIG. 4. "NULL" data is input to the input terminals IN2 of the remaining selectors 772i to 772p. Moreover, in order to perform the standard recording, recording data is input to input terminals IN1 of selectors 772a to 772p one bit each as shown in FIG. 4.

Either the recording data separated to even number dots and odd number dots or 16 bits of input recording data itself is output selectively from the second selector group 772 according to the control signal S2. In other words, the control signal S2 functions as the mode signal which switches between the standard recording and the interlace recording. In addition, each of numerals 0 to 15 designated to the recording data means data corresponding to nozzles N0 to N15 of the recording head in FIG. 4.

According to such structure, by transferring the same 16 bits of data from the RAM/DMA controller 105 twice, for example, the odd number dots can be selected at the first transfer and the even number dots can be selected at the second transfer from the even/odd number dot selection circuit 177.

Figure 5:
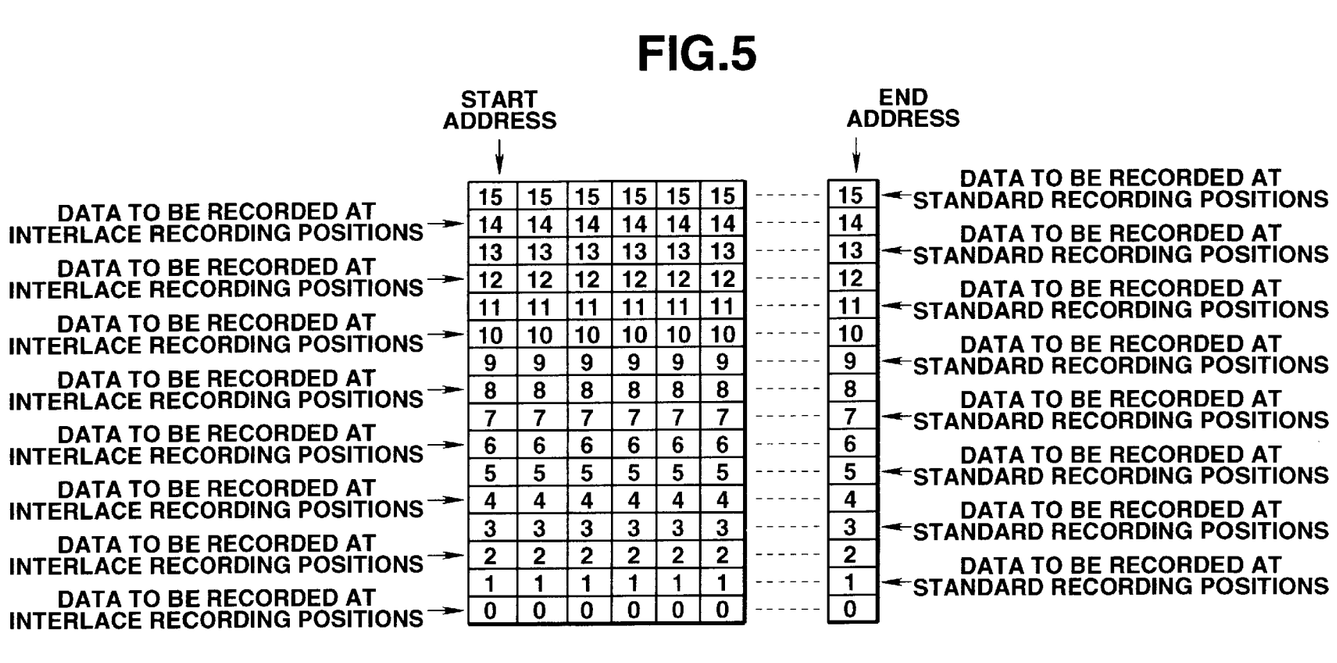
FIG. 5 is an illustration showing one example of the recording data developed in a RAM.

Therefore, the CPU 101 does not need to distinguish the even number dots from the odd number dots or, in other words, does not need to separate even number dots from odd number dots to develop the recording data to the RAM 103 in consideration of the interlace recording. As shown in FIG. 5, for example, 16 dots of recording data in the direction of sub-scanning, in other words data of even number dots (interlace recording position), and data of odd number dots (standard recording position), may be stored in one area of the RAM 103 of which addresses are successive.

Figure 6:
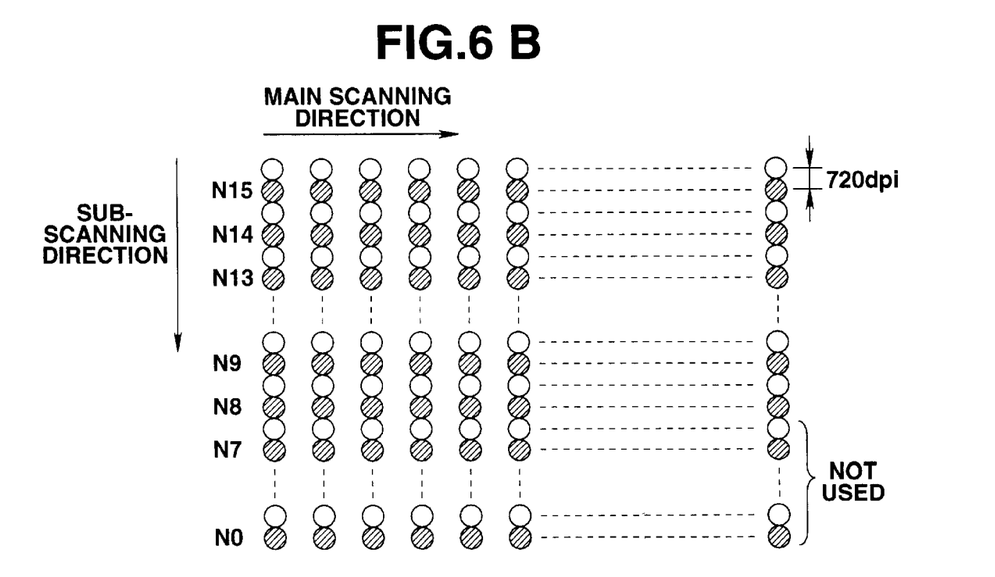
FIGS. 6A and 6B are illustrations showing a condition of interlace recording of the first embodiment.
Figure 6A:
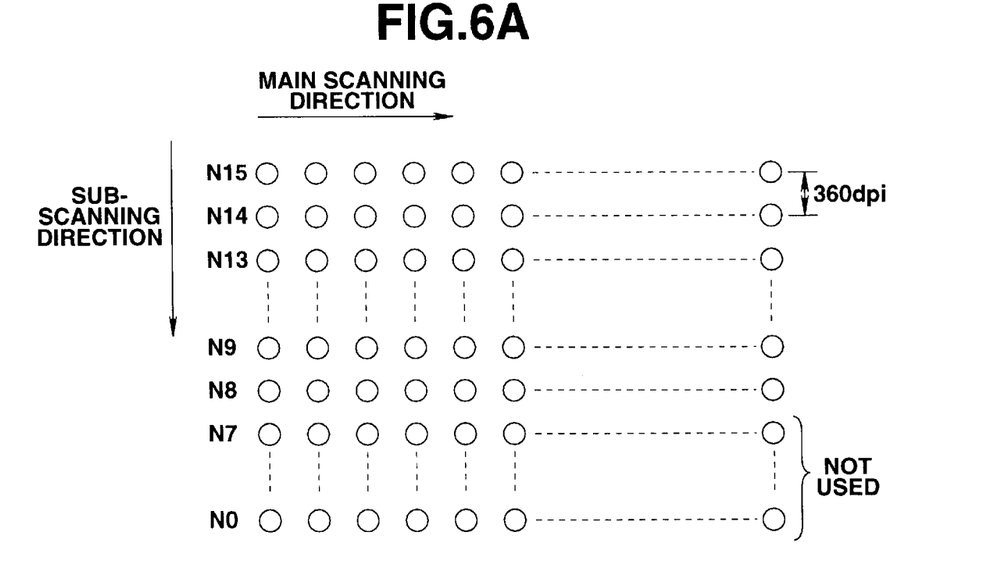

At the time of a practical recording operation, the interlace recording mode is set by the control signal S2 in advance. And, in order that the even/odd number dot selection circuit 177 selects the odd number dots, the CPU 101 outputs the control signal S1 and a start address of the recording buffer to the RAM/DMA controller 105. Afterward, the carriage motor 111 is driven to record one main scan line of recording (8 nozzles width) at the standard recording positions as shown in FIG. 6A. Since NULL data is input to the lower half nozzles, the lower half nozzles are not used as a result.

Secondly, the CPU 101 drives the line feed motor 14 to control the recording medium to feed $1/720$ inch in the direction of sub-scanning. And, in order that the even/odd number dot selection circuit 177 selects the even dots, the CPU 101 outputs the control signal S1 and the start address (that is the same start address of recording as the above-mentioned standard recording position) of the recording buffer to the RAM/DAM controller 105. Afterward, the carriage motor 110 is driven as shown in FIG. 6B and one main scan line of recording (8 nozzle width) is recorded at the middle positions (interlace positions) of the standard recording positions as shown by the cross-hatched circles.

As mentioned above, one line of 16 dot width (8 nozzle width) image of recording at a resolution of 720 dpi is completed in the direction of sub-scanning.

Next, the recording medium is fed by ($8 \times 1/360$ (8 nozzle width)$-1/720$) inch or $15/720$ inch in the direction of sub-scanning for recording of the following main scan line.

In this embodiment, by transferring the same recording data twice, selecting the recording data of the odd number dots or the even number dots at every transfer by the head controller and outputting selected data to the recording head, the interlace recording is performed. Therefore, the CPU 101 of the control circuit neither need control to select the recording data nor need control to store the selected recording data to the memory at every selection, so it is possible to reduce the load on the CPU during interlace recording.

By doing this, the CPU can perform other recording controls efficiently, and the whole recording performance improves as a result. Moreover, since half of the nozzles are used in the interlace recording in this embodiment, a buffer capacity in the sub-scanning direction does not need to be large. As a result, the buffer capacity is limited to twice the increase in the main scanning direction.

<Second Embodiment>

In the first embodiment, the upper half 8 nozzles of the 16 nozzles of the recording head are used in recording at a resolution of 720 dpi. In order to equalize the use frequency of the nozzles in order to lengthen the life of the recording head, it is better to also use the lower half nozzles of the recording head.

Figure 7:
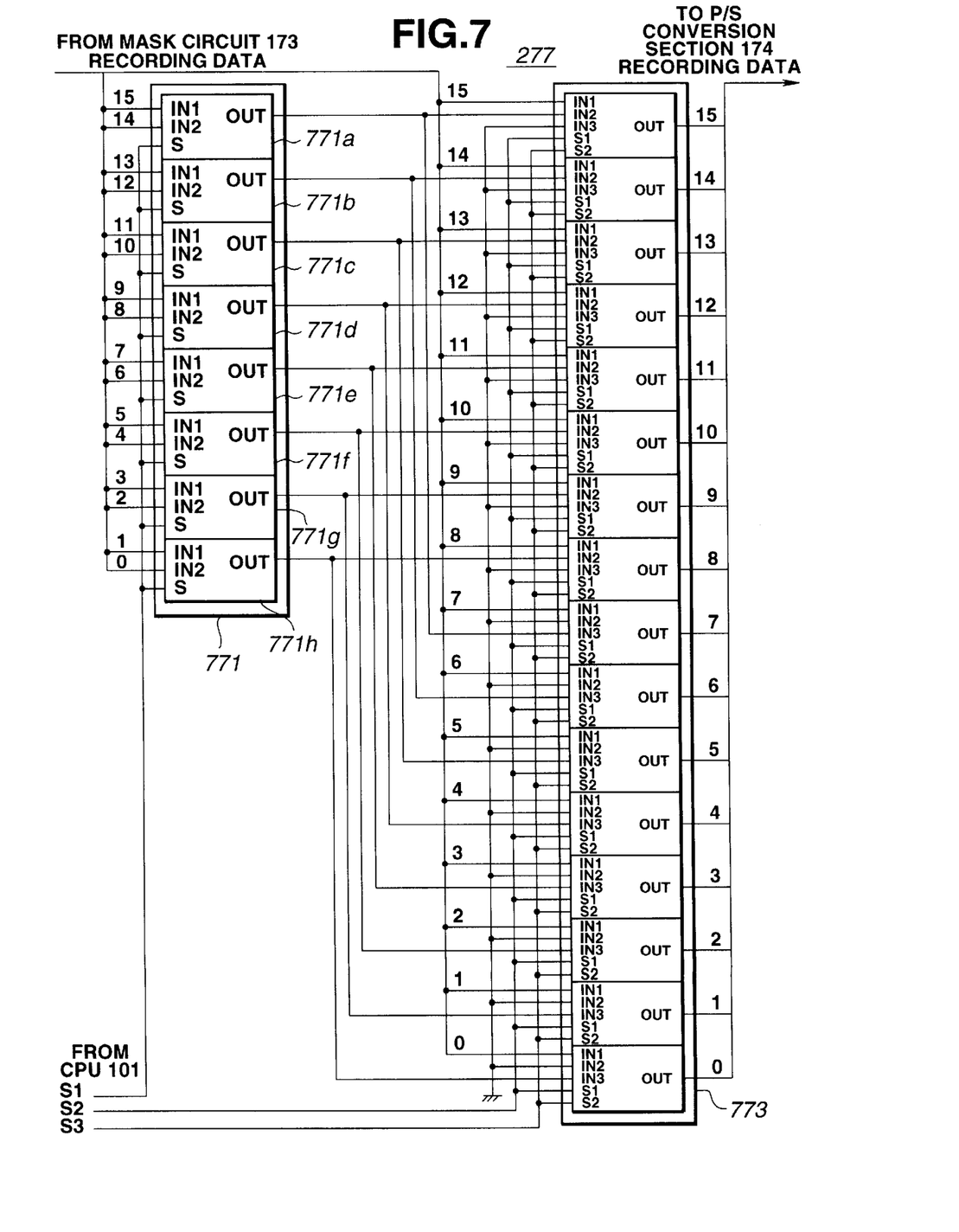
FIG. 7 is a block diagram showing detailed structure of a second embodiment of the even/odd number dot selection circuit.

In this embodiment, the even/odd number dot selection circuit 277 shown in FIG. 7 is used instead of the even/odd number dot selection circuit 177 shown in FIG. 4. This selection circuit 277 has a third selector group 773 instead of the second selector group 772 shown in FIG. 4 and is operated by the control signals S1, S2 and S3. The third selector group 773 has an additional input terminal IN3 and is structured to transfer 8 bits of "NULL" data to the upper half 8 bits so as to be able to use the lower half 8 nozzles for recording actually. In other words, the control signal S3 input to the control input terminal S2 controls whether the upper half nozzles or lower half nozzles are used for recording.

<Other Embodiments>

In the above-mentioned embodiments, although in order to record at the interlace position, the recording medium is fed by 1/720 inch, the present invention is not limited to this. For example, the recording medium may be fed by integer multiples of 1/720 inch to effect multi-pass recording. In this case, it is desirable to provide a buffer having a capacity of more than one line.

Moreover, though the interlace recording of 1:2 is explained in the embodiment mentioned above, the present invention can be applied to the interlace recording of 1:n, where n is an integer greater than 2.

As explained above according to the present invention, since there is no need to restructure the recording data arrangement and to restore the restructured data in consideration of the interlace recording, it has the effect to be able to perform interlace recording by simple structure.

By this, since, for example, there is no need to restructure the recording data arrangement and to restore the restructured data by the CPU and so on, the load of the CPU is reduced and the recording throughput will improve as a result. In addition according to the invention, since the memory to store the restructured data becomes unnecessary, increase in storage capacity of a memory can be restrained and a cost of the apparatus can be reduced.

The ink jet recording apparatus using heating elements as recording elements is an example of a recording apparatus, but the present invention is not limited to that. The present invention can be applied to other recording apparatuses such as a thermal recording apparatus using heating elements, an LED recording apparatus using LED elements, and an impact recording apparatus using wire elements as recording elements.

Typical structures and operational principles of such devices to which the present invention can be applied, can preferably be such as those disclosed in U.S. Pat. Nos. 4,723,129 and 4,740,796. Those principles and structures are applicable to a so-called on-demand type recording system and to a continuous type recording system, but are particularly suitable to the on-demand type. Such an approach adopts the principle that at least one driving signal is applied to an electrothermal transducer disposed on a liquid (ink) retaining sheet or in a liquid passage, the driving signal being sufficient to provide a quick temperature rise beyond a departure-from-nucleation boiling point. The thermal energy provided by the electrothermal transducer produces film boiling on the heating portion of the recording head, whereby a bubble can be formed in the liquid (ink), in response to each driving signal. The production, development and contraction of the bubble cause ejection of the liquid (ink) through an ejection outlet to produce at least one droplet. The driving signal is preferably in the form of a pulse, because this enables the development and contraction of the bubble to be effected instantaneously, and therefore, the liquid (ink) is ejected with quick response to the driving signal. The pulse-shaped driving signal is preferably formed as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600, wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670, wherein a common slit is used as the ejection outlet for plural electrothermal transducers, and to the structure disclosed in Japanese Laid-Open Patent Application No. 59-138461, wherein an opening for absorbing pressure waves of the thermal energy is formed corresponding to the ejecting portion. This is because the present invention is effective to perform recording with certainty and at high efficiency regardless of the type of recording head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container.

Provision of the recovery means and/or the auxiliary means for the preliminary operation is preferable, because those features can further stabilize the effects of the present invention. Examples of such means include a capping means for the recording head, cleaning means therefor, pressurizing or suction means for keeping the ink ejection outlets or orifices clean, and preliminary heating means (which may be an electrothermal transducer, an additional heating element or a combination thereof). Also, means for effecting preliminary ejection (to precede the actual recording operation) can stabilize the recording operation.

The recording head may be a single head which records using a single color ink, or may be plural heads corresponding to plural ink materials having different recording colors or densities. The present invention is effectively applied to an apparatus having at least one of a monochromatic mode (using black ink, most commonly), a multi-color mode using different color ink materials, and/or a full-color mode using a mixture of colors, which may be an integrally-formed recording unit or a combination of plural recording heads.

The ink jet recording apparatus may be used as an output terminal of an information processing apparatus such as a computer or the like, as a copying apparatus when combined with an image reader or the like, or as a facsimile machine having information sending and receiving functions.

The entire disclosures of U.S. Pat. Nos. 4,740,796; 4,723,129; 4,558,333; 4,463,359; 4,459,600; and 4,345,262, and those of Japanese Laid-Open Patent Application Nos. 54-56847, 59-123670, 59-138461, and 60-71260, are incorporated herein by reference.

While the invention has been described with reference to the preferred structures disclosed herein, it is not confined to the details set forth above; to the contrary, many modifications and variations thereof will be readily apparent to those skilled in the art, and this application is intended to cover all such modifications or changes as may come within the purposes of the disclosed improvements disclosed above, within the scope of the following claims.

We claim:

1. A recording apparatus for recording onto a recording medium at a higher density than a density at which recording elements of a recording head are arranged by performing interlace recording, said recording apparatus comprising:

main scanning means for main scanning the recording head to record lines of dots;

sub-scanning means for relatively sub-scanning the recording head and the recording medium;

scanning control means for controlling sub-scan between the recording head and the recording medium to enable the recording head to interlace record between the lines of dots recorded in main scanning;

a memory storing recording data of the lines of dots;

a selector; and read-out means for reading out a set of the recording data from said memory, the set of recording data for recording at separate sub-scanning positions, and supplying the set of recording data to said selector, wherein said selector complementarily selects subsets of recording data from the set of recording data supplied by said read-out means, each subset of selected recording data corresponding to different image lines in the sub-scanning direction and alternately supplies the selected subsets of recording data corresponding to the different image lines to the recording head with each main scanning.

2. An apparatus according to claim 1, wherein said memory stores the recording data at a higher density than the density at which the recording elements are arranged.

3. A recording apparatus according to claim 2, wherein said read-out means reads out the set of recording data from said memory in a direction corresponding to a direction in which the recording elements are arranged and said selector complementarily selects subsets of recording data corresponding to the density at which the recording elements are arranged to supply the selected subsets of recording data to the corresponding recording elements.

4. An apparatus according to claim 1, wherein said memory stores the recording data at a same density as a density recorded by performing the interlace recording.

5. An apparatus according to claim 1, wherein said scanning control means controls said sub-scanning means so as to relatively sub-scan the recording head between recordings of selected subsets recording data of the set of recording data by a distance of 1/n of a distance between adjacent recording elements, where n is an integer.

6. An apparatus according to claim 5, wherein n equals 2, and said selector first selects the subset of recording data corresponding to odd number lines with regard to the sub-scanning direction and then selects the subset of recording data corresponding to even number lines.

7. An apparatus according to claim 1, wherein said selector selects the recording data to be supplied to the recording head so as to use half of the recording elements of the recording head for interlace recording.

8. An apparatus according to claim 7, wherein said selector selects the recording data to be supplied to the recording head so as to change the recording elements to be used.

9. An apparatus according to claim 1, further comprising a mode switch for switching between a recording mode in which a non-interlace recording is performed and a recording mode in which the interlace recording is performed, said mode switch being controlled by said scanning control means.

10. A recording apparatus according to claim 1, wherein said selector comprises at least one group of switches, wherein each of the switches of one of said at least one group of switches receives plural input signals corresponding to more than one recording element and is controlled to selectively output one of the plural input signals.

11. A recording apparatus according to claim 10, wherein said selector further comprises a second group of switches and each of the switches of the second group of switches corresponds to a different one of the recording elements of the recording head and comprises at least a first input port and a second input port, wherein recording data for a corresponding recording element is input to the first input port of each of the switches of the second group of switches and outputs of the one group of switches are input to each corresponding switch of a portion of the second group of switches and null data is input to each switch of a remaining portion of the second group of switches.

12. A recording apparatus according to claim 11, having a non-interlace recording mode wherein all of the switches of the second group of switches output recording data corresponding to the recording elements.

13. A recording apparatus according to claim 11, wherein in an interlace recording mode a first half of the switches of the second group of switches outputs recording data output from corresponding switches of the first group of switches and a second half of the switches of the second group outputs null data.

14. A recording apparatus according to claim 13, wherein in the interlace recording mode, the second group of switches is controlled so that the first half of switches and the second half of switches alternately output recording data and null data.

15. An apparatus according to claim 1, wherein said main scanning means comprises a carriage for moving the recording head.

16. An apparatus according to claim 1, wherein said sub-scanning means comprises a transporter for transporting the recording medium.

17. An apparatus according to claim 1, wherein the recording head effects recording by discharging a recording liquid.

18. An apparatus according to claim 1, wherein the recording elements comprise heating elements that generate thermal energy.

19. An apparatus according to claim 18, wherein the recording head discharges the recording liquid by applying the thermal energy to a recording liquid.

20. An apparatus according to claim 1, further comprising the recording head.

21. An apparatus according to claim 1, further comprising a plurality of recording heads for use in the main scanning and the sub-scanning and controlled by said main scanning means and said sub-scanning means, wherein each of said recording heads records in a different color.

22. An apparatus according to claim 1, wherein said recording apparatus is a terminal for a computer.

23. An apparatus according to claim 1, further comprising an image scanner providing image data that is recorded by the recording head.

24. An apparatus according to claim 1, further comprising an image scanner providing image data that is recorded by the recording head and a data transmitting and receiving unit transmitting the image data from the image scanner to a recipient at a remote location and receiving image data from the remote location or another remote location.

25. A controller for controlling recording onto a recording medium, by a recording head during main scanning, at a higher density than a density at which recording elements of the recording head recording lines of dots are arranged by controlling interlace recording, said controller comprising:
   scanning control means for controlling sub-scan between the recording head and the recording medium to enable the recording head to interlace record between lines of dots recorded in main scanning;
   a selector; and
   read-out means for reading out a set of the recording data of the lines of dots from a memory, the set of recording data for recording at separate sub-scanning positions, and supplying the set of recording data to said selector,
   wherein said selector complementarily selects subsets of recording data from the set of the recoding data, each subset of selected recording data corresponding to different sub-scanning positions, and alternatively supplies the selected subsets of recording data to the recording head with each main scanning.

26. A controller according to claim 25, wherein said memory stores the recording data at a higher density than the density at which the recording elements are arranged.

27. A controller according to claim 26, wherein said read-out means reads out the set of recording data from said memory in a direction corresponding to a direction in which the recording elements are arranged and said selector complementarily selects subsets of recording data corresponding to the density at which the recording elements are arranged to supply the selected subsets of recording data to the corresponding recording elements.

28. A controller according to claim 25, wherein said memory stores the recording data at a same density as a density recorded by performing the interlace recording.

29. A controller according to claim 25, wherein said scanning control means controls a sub-scanning unit so as to relatively sub-scan the recording head between recordings of selected subsets of recording data of the set of recording data by a distance of 1/n of a distance between adjacent recording elements, where n is an integer.

30. A controller according to claim 29, wherein n equals 2, and said selector first selects the subset of recording data corresponding to odd number lines with regard to the sub-scanning direction and then selects the subset of recording data corresponding to even number lines.

31. A controller according to claim 25, wherein said selector selects the recording data to be supplied to the recording head so as to use half of the recording elements of the recording head for interlace recording.

32. A controller according to claim 3, wherein said selector selects the recording data to be supplied to the recording head so as to change the recording elements to be used.

33. A controller according to claim 25, further comprising a mode switch for switching between a recording mode in which a non-interlace recording is performed and a recording mode in which the interlace recording is performed, said mode switch being controlled by said scanning control means.

34. A controller according to claim 25, wherein said selector comprises at least one group of switches, wherein each of the switches of one of said at least one group of switches receives plural input signals corresponding to more than one recording element and is controlled to selectively output one of the plural input signals.

35. A controller according to claim 34, wherein said selector further comprises a second group of switches and each of the switches of the second group of switches corresponds to a different one of the recording elements of the recording head and comprises at least a first input port and a second input port, wherein recording data for a corresponding recording element is input to the first input port of each of the switches of the second group of switches and outputs of the one group of switches are input to each corresponding switch of a portion of the second group of switches and null data is input to each switch of a remaining portion of the second group of switches.

36. A controller according to claim 35, having a standard recording mode, wherein all of the switches of the second group of switches output recording data corresponding to the recording elements.

37. A controller according to claim 35, wherein in an interlace recording mode a first half of the switches of the second group of switches outputs recording data output from corresponding switches of the first group of switches and a second half of the switches of the second group outputs null data.

38. A controller according to claim 37, wherein in the interlace recording mode, the second group of switches is controlled so that the first half of switches and the second half of switches alternately output recording data and null data.

39. A recording method for recording onto a recording medium at a higher density than a density at which recording elements of a recording head are arranged by performing interlace recording, said recording method comprising the steps of:
   reading a set of recording data from a memory of lines of data;
   selecting a subset of subsets of recording data from the set of recording data read from the memory to supply the selected subset of recording data to the recording head, each subset of recording data corresponding to different sub-scanning positions;
   recording lines of data onto the recording medium based on the selected subset of recording data during main scanning of the recording head;
   relatively sub-scanning the recording head to the recording medium to enable the recording head to interlace record between lines of data recorded in the main scanning of said recording step;
   complementarily selecting another subset of recording data from the set of recording data of the lines in accordance with the different sub-scanning positions to supply the complementarily selected subset of recording data to the recording head; and
   recording onto the recording medium based on the complementarily selected subset of recording data during main scanning of the recording head.

40. A method according to claim 39, wherein said sub-scanning step relatively sub scans the recording head between said recording steps by a distance of 1/n of a distance between adjacent recording elements, where n is an integer.

41. A method according to claim 40, wherein n equals 2, and said selecting step selects the subset of recording data corresponding to odd number lines with regard to the sub-scanning direction, and said complementary selecting step selects the subset of recording data corresponding to even number lines.

42. A method according to claim 39, wherein said selecting steps select the recording data to be supplied to the recording head so as to use half of the recording elements of the recording head for interlace recording.

43. A method according to claim 42, wherein said selecting steps select the recording data to be supplied to the recording head so as to change the recording elements to be used.

44. A method according to claim 39, further comprising the step of switching a recording mode between a non-interlace recording mode and an interlace recording mode.

45. A method according to claim 39, further comprising the step of storing the recording data in the memory before said reading steps.

46. A recording method according to claim 39, wherein said reading steps read the set of recording data stored in the memory at a higher density than the density at which the recording elements are arranged in a direction corresponding to a direction in which the recording elements are arranged and said selecting steps complementarily select subsets of recording data corresponding to the density at which the recording elements are arranged to supply the selected subsets of recording data to the corresponding recording elements.

* * * * *

UNITED STATES PATENT AND TRADEMARK OFFICE
CERTIFICATE OF CORRECTION

PATENT NO. : 6,070,963
DATED : June 6, 2000
INVENTOR(S) : KAMADA ET AL.

It is certified that error appears in the above-identified patent and that said Letters Patent is hereby corrected as shown below:

COLUMN 3:
  Line 5, "sub" should read --sub- --.
  Line 56, "sub scanning" should read --sub-scanning--.

COLUMN 9:
  Line 29, "recording actually." should read --actual recording.--.

COLUMN 11:
  Line 63, "subsets" should read --subsets of--.

COLUMN 13:
  Line 31, "recoding" should read --recording--.
  Line 64, "claim 3," should read --claim 31,--.

Signed and Sealed this

Tenth Day of April, 2001

Attest:

NICHOLAS P. GODICI

*Attesting Officer*                *Acting Director of the United States Patent and Trademark Office*